United States Patent [19]
Freed

[11] Patent Number: 6,024,115
[45] Date of Patent: Feb. 15, 2000

[54] MULTICANNULAR FLUID DELIVERY SYSTEM

[76] Inventor: John F. Freed, RR #2, Box 278A, North Clarendon, Vt. 05759

[21] Appl. No.: 08/896,020

[22] Filed: Jul. 17, 1997

[51] Int. Cl.$^7$ .............................. F16L 9/18; F16L 55/00; B65B 1/04
[52] U.S. Cl. .......................... 137/312; 73/49.1; 138/113; 138/114; 141/88; 251/58; 285/123.1
[58] Field of Search ............................ 137/312; 138/103, 138/104, 113, 114; 141/88; 285/123.1; 73/49.1, 46; 251/58

[56] References Cited

U.S. PATENT DOCUMENTS

| | | | |
|---|---|---|---|
| 5,156,190 | 10/1992 | Staley, Jr. ................................. | 137/312 |
| 5,265,652 | 11/1993 | Brunella .................................. | 137/312 |
| 5,285,829 | 2/1994 | Bravo ..................................... | 137/312 |
| 5,529,098 | 6/1996 | Bravo ..................................... | 137/312 |

*Primary Examiner*—George L. Walton
*Attorney, Agent, or Firm*—John J Welch Jr, Esq

[57] ABSTRACT

The instant invention consists of an inner cannula of hosing amenable to transport of a liquid coupled with an outer cannula or cannulae of hosing amenable to transport of a gas. As respects one embodiment, affixed to outer walling of the inner cannula and to inner walling of the outer cannula are rigid struts, typically three or four, at 120° or rights angles with respect to one another at various points along the respective lengths of the cannulae that serve to maintain separation of the cannulae from one another at times when the inner cannula is filled with a liquid and the outer cannula is filled with a gas. A second embodiment is strut free. Each cannula has an ingress end whereat a liquid is introduced into the inner cannula and whereat a gas is introduced into the outer cannula. Each cannula likewise has an egress end whereat the liquid is expelled typically from a nozzle thereat located and the gas is amenable to discharge via the opening of a valve component of the instant invention likewise thereat located.

16 Claims, 9 Drawing Sheets

MULTICANNULAR FLUID DELIVERY SYSTEM

BACKGROUND OF THE INVENTION

1. Field of the Invention

The instant invention is one of those devices characterized by hosing amenable to transport of fluids under pressure.

2. Prior Art

Your inventor is not aware of any prior art that in any way resembles the instant invention.

A SUMMARY OF THE INVENTION

1. A Brief Description of the Invention

The instant invention is a multicannular fluid delivery system consisting of inner hosing circumscribed by outer hosing with a first manifold ring characterized by the presence of a center through hole affixed to a first end of the inner hosing and a first end of the outer hosing such that gas under pressure from the situs of a pump via piping can ultimately enter the manifold ring through an extrusion protruding from a circumferential side of the ring and from that point enter into a hollow space within the body of the ring to exit therefrom through a plurality of holes emanating from the space, through the body of the ring into space between the hosing components and with a second manifold ring characterized by the presence of a center through hole affixed to a second end of the inner hosing and a second end of the outer hosing with a plurality of holes within the body of the second ring amenable to permitting gas within the space between the hosing components to enter a hollow space within the body of this ring and emanate to outer atmosphere when a valve component affixed to an extrusion protruding from a circumferential side thereof is in an open position. Valve activated fluid flow from a storage tank through manifold center holes and inner hosing is controlled by pressure from the gas acting on a spring loaded actuation cylinder within a closed compartment that keeps the valve open thereby permitting continuing fluid flow therefrom as long as the same pressure from the gas as is on the cylinder is also maintained within the space between the hosing components while the gas is being pumped from a pump site simultaneously through piping to the closed compartment housing the actuation cylinder and through piping leading ultimately to the extrusion protruding from the first manifold ring component of the instant invention.

2. Objects of the Invention

It is often the case that hazardous and/or highly flammable chemicals are required to be moved via hosing under pressure from an initial storage site, for example, a first bulk transfer tank to a subsequent storage site, for example a second bulk tank. It is however the case that often such materials leak from broken hosing while being so transported or alternatively, the hosing system breaks down or separates, causing such materials under the pressure of delivery to leach violently out of or near the delivery end of the hosing system into the surrounding environment, often with resultant dire consequences such as fire and/or explosion and/or prospective long term environmental contamination. The instant invention serves to poignantly address such problems as such leaching out and/or breakage so as to effectively prevent same from ever occurring. If hose separation or breakage occurs, during liquid delivery under pressure from an initial storage sit to a subsequent storage site, such separation or breakage with resort to the instant invention will result in gas leakage to the outer atmosphere concomitantly with liquid leakage thereto. But, delivery of the liquid from the initial storage site will by virtue of such gas leakage, be immediately terminated by way of the immediate closure of a release valve located at the initial storage site that is constructed so as to close and immediately terminate the flow of liquid in the event of a sudden drop in such gas pressure within the instant invention's closed system consisting of a pump, a release valve, gas activated actuator cylinder and piping leading simultaneously from the pump to the actuation cylinder and as well the above-mentioned extrusion from the above-mentioned first manifold ring. Such pressure regulated release and/or closure invariably results in immediately terminated delivery of liquid from the initial storage site to the inner cannula of the hosing such that the only amount of such liquid released to the outer atmosphere in the event of such breaking or leakage would be, at most, only whatever amount as would then have been found within the inner cannula of such hosing. Only, at most, no more than the same limited amount of liquid could be released or indeed none at all in the event of no breakage or separation of delivery unit parts if gas pressure within the outer cannula were nevertheless reduced by way of the opening of a discharge valve located at or about the egress end of the hosing, to the degree necessary to effectuate initial storage site release valve closure via concomitant reduction of that amount of gas pressure necessary to maintain that release valve in an open position by way of pressure, within a closed pump-piping-outer cannula fluid delivery system, being maintained as against a typical spring loaded pressure activated release valve actuator component within a closed compartment.

In view of the fact that uncontrolled pressurized fluid flow from broken hosing of a hazardous substance such as liquid propane or sulfuric acid into surrounding environs portends the occurrence of an invariably egrecious ecological disaster, it is respectfully submitted, that the instant invention is, not only new, useful and unique but indeed from a vantage point of safety concerns and utility, virtually revolutionary in respect of the matter of the art of pressurized fluid delivery systems.

A DESCRIPTION OF THE DRAWINGS

A DESCRIPTION OF THE PREFERRED EMBODIMENTS

Figure 1:
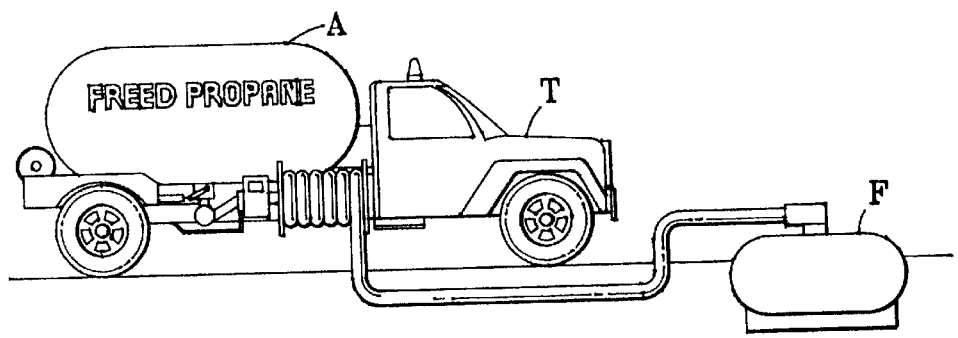
FIG. 1 is a lateral plan view of a home delivery fuel truck shown connected to a home fuel storage tank.
Figure 2:
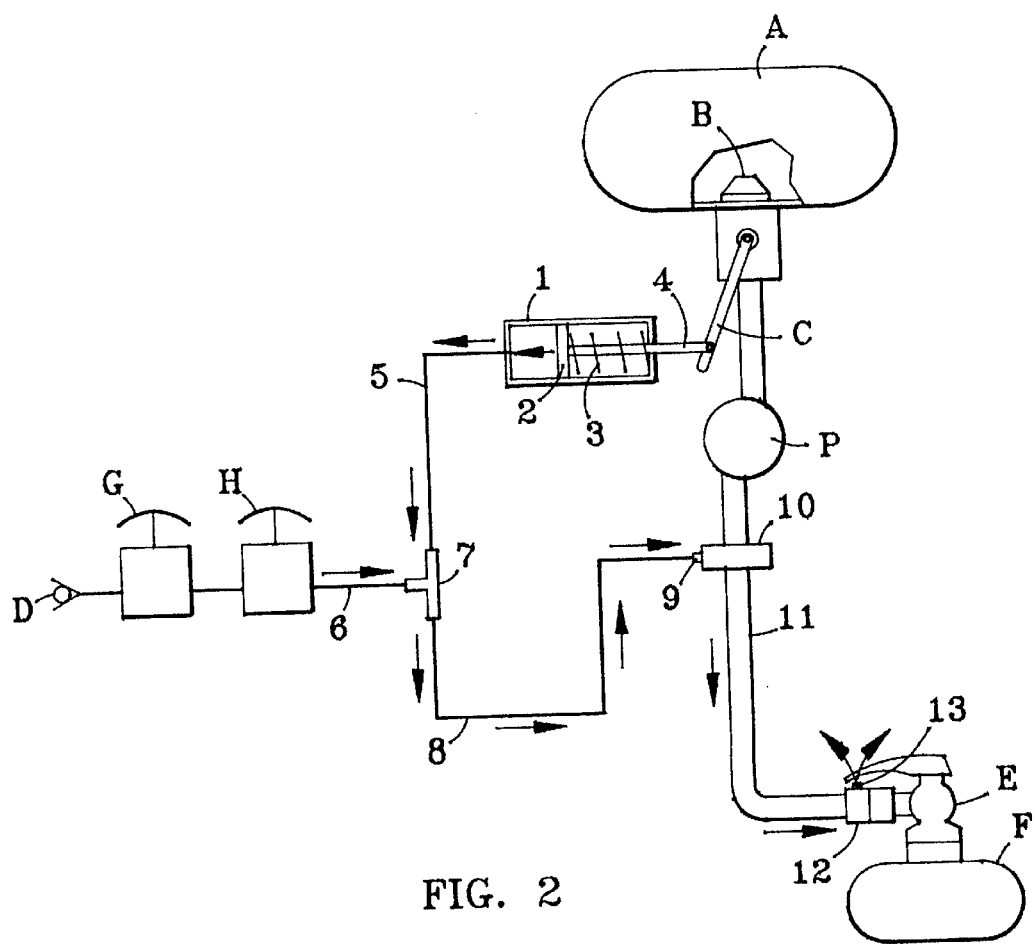
FIG. 2 is a schematic diagram of the various components of a first embodiment of the instant invention depicting non-flow of the fuel stored in a fuel truck in the absence of gas under pressure within the piping portions of the instant invention.
Figure 3:
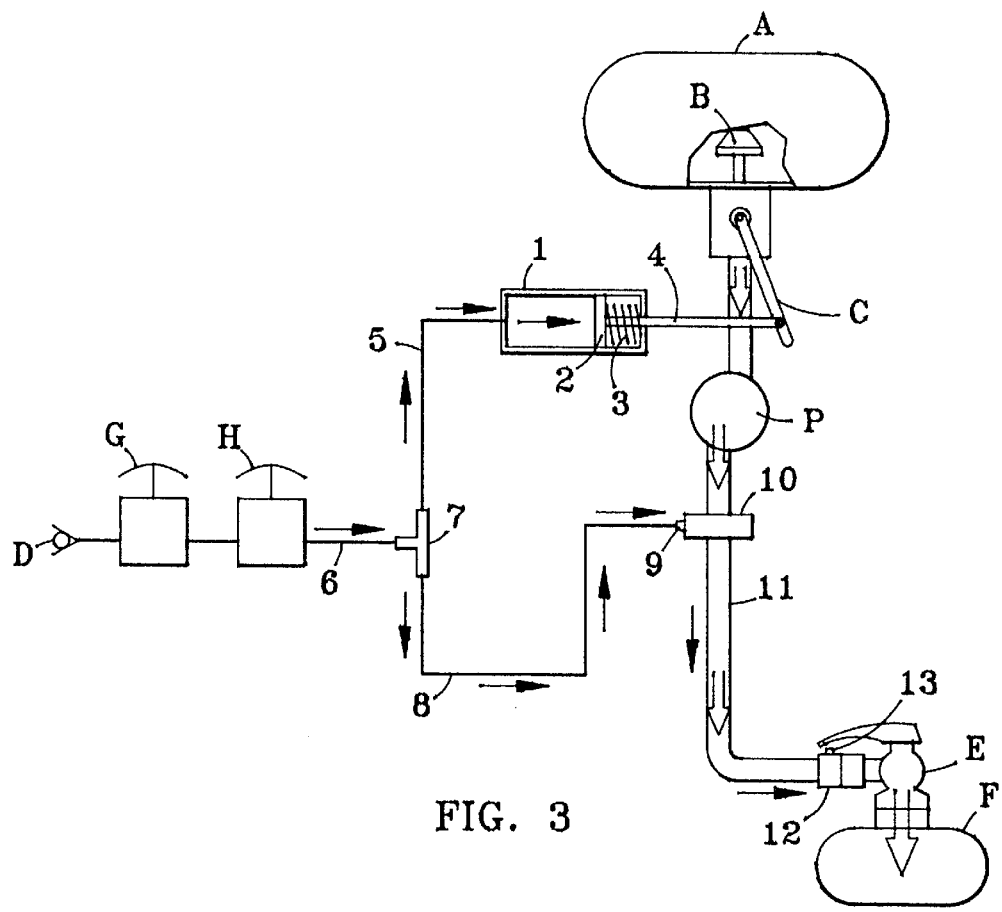
FIG. 3 is a schematic diagram of the various components of a first embodiment of the instant invention depicting flow of the fuel stored in a fuel truck in the presence of gas under pressure within the piping portions of the instant invention.
Figure 4:
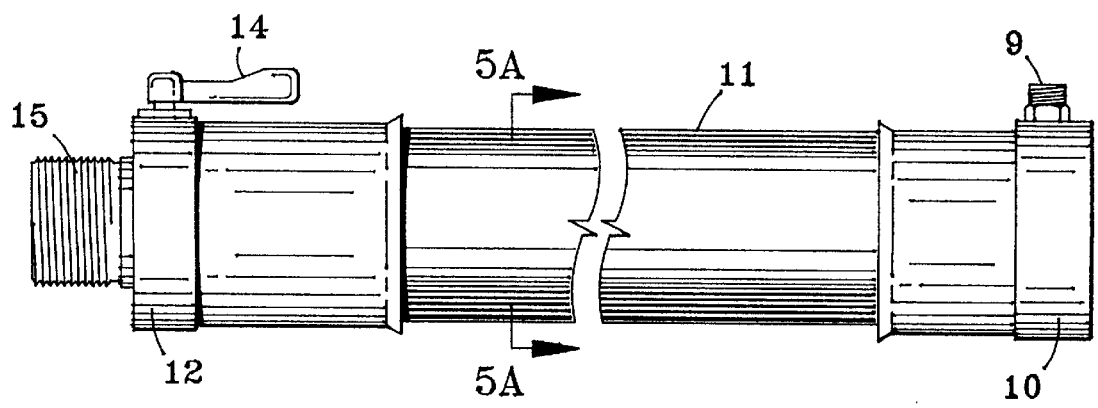
FIG. 4 is a broken plan view of the exterior of the outer hosing component the instant invention.
Figure 5A:
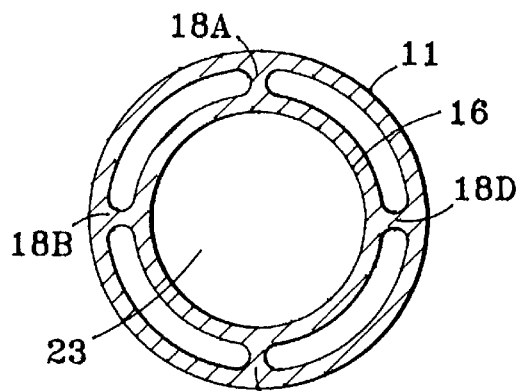
FIGS. 5A, 5B and 5C are cross-sectional views of variant forms of the multicannular hosing component of the instant invention.
Figure 5B:
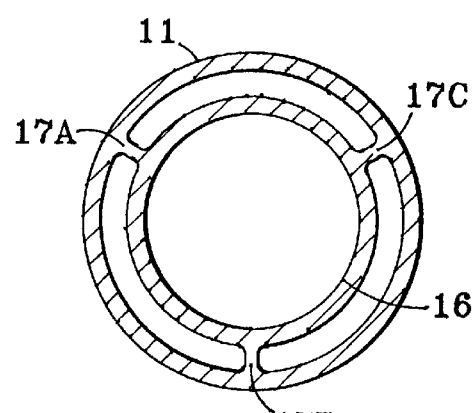
Figure 5C:
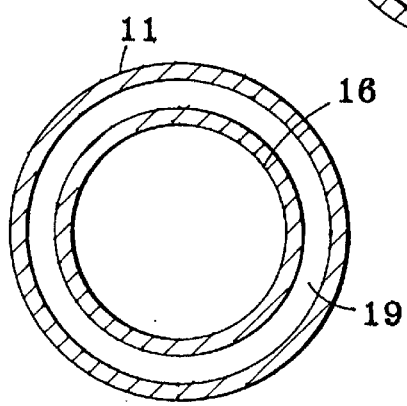

FIG. 1 shows a home delivery fuel truck T equipped with an initial storage site, a first bulk transfer tank A and the instant invention serving to effectuate, in a uniquely safe manner, the transfer of fuel from tank A to a subsequent storage site, for example, a second bulk tank F such as might be found in a typical residential home. FIGS. 2 and FIG. 3 are schematic depictions of the instant invention illustrating respectively its depressurized state and concomitantly foreclosed fluid flow and its pressurized state and concomitantly facilitated fluid flow. With resort to FIG. 3, release valve B in tank A is open by virtue of the effect of gas, for example, air pumped under pressure from a compressor site D. Compressor site D in respect of a first application of the instant invention is a pump mechanism on truck T and amenable to being switched on or off. As long as valve B is open, fluid flows from tank A to tank F. FIG. 4 is a broken plan view of the outer hosing component 11 of the instant invention. FIGS. 5A, 5B and 5C show outer hosing component 11 circumscribing inner hosing component 16. Each of these figures evidence different variations of the instant invention. FIG. 5C shows one variation. FIG. 5A, a second variation, shows 4 rigid struts 18A, 18B, 18C and 18D, separating hosing components 11 and 16 and FIG. 5B, yet, another variation shows 3 rigid struts, 17A, 17B and 17C separating hosing components 11 and 16. The struts are affixed to outer walling of hosing component 16 and inner walling of hosing component 11 and are found at various points along the lengths of the hosing components 11 and 16 between first manifold ring 10 and second manifold ring 12 in order to maintain the integrity of spacing 19 as between hosing components 11 and 16 so as to better facilitate the flow of gas within spacing 19. But, the invention is not necessarily in need of such struts and can function as per FIG. 5C without them. However, the three strut configuration as shown in FIG. 5B would be the most preferred variation in terms of economic efficacy in respect of maintaining continuous spacing as between components 11 and 16. Fluid disembarking an initial storage site within first bulk transfer tank A by way of an open release valve B is pumped under pressure by a pump P through hosing means I connected at one end to tank A and at a second end to a first center through hole 22 of a first manifold ring 10 seen in FIG. 7. The fluid flows to and through first center through hole 22 and then flows the length of hosing component 16 along inner cannula 23 seen in FIG. 5A to where it encounters center through hole 28 in second manifold ring 12 seen in FIG. 13. The fluid then proceeds by way of nozzle means 15 affixed to an outside end side of manifold ring 12 as seen in FIG. 4 and then into a portal E shown close up in FIG. 14, of a subsequent storage site or second bulk tank F as seen in FIG. 2. The fluid flowing under pressure is perhaps highly flammable, combustible propane or perhaps highly corrosive sulfuric acid or sodium hydroxide. If the intertank hosing system or fittings connected therewith and serving to transfer such fluid were to break while such a fluid substance was flowing, with a release valve B open, an ecological catastrophe could easily result in the time it would have taken to shut off release valve B after the onset of the break in the line or fitting. Such a catastrophe could take the form of egregious ecological contamination on the one hand to indeed perhaps even a deadly explosion on the other. The instant invention in respect of its various embodiments and variations addresses that problem by way of serving to ensure that once breakage is imminent that then release valve B is immediately shut down thereby averting any mass spills of fluid into the surroundings about the intertank hosing and related fittings and concomitantly averting any patently massive contamination or explosions. The only fluid that would find its way into the surroundings with resort to utilization of the instant invention would be at most only that relatively small amount thereof as would be located within the intertank hosing, but, clearly no more than that.

Figure 6:
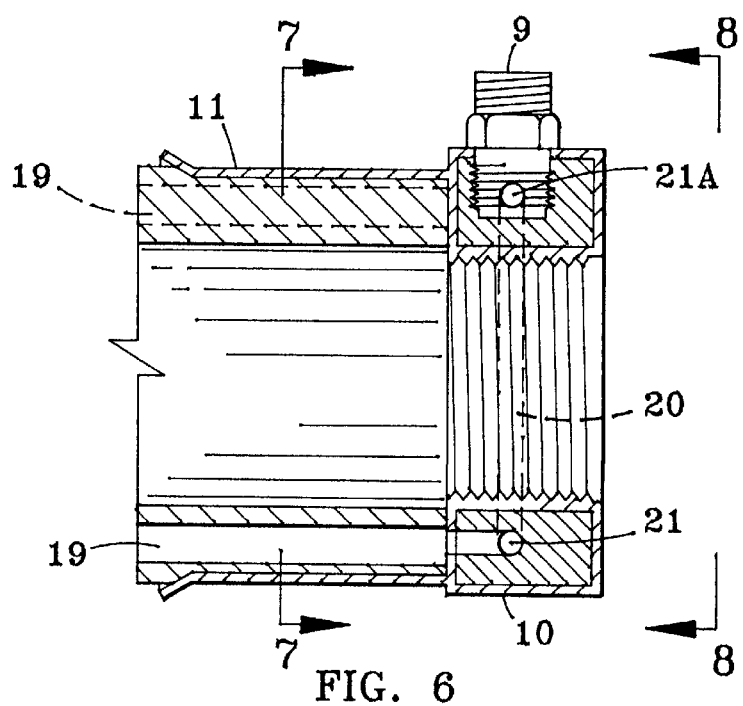
FIG. 6 is a vertical cross sectional view of the one of the manifold ring components of the instant invention positionable at the ingress end thereof shown affixed to the hosing component of the instant invention.
Figure 7:
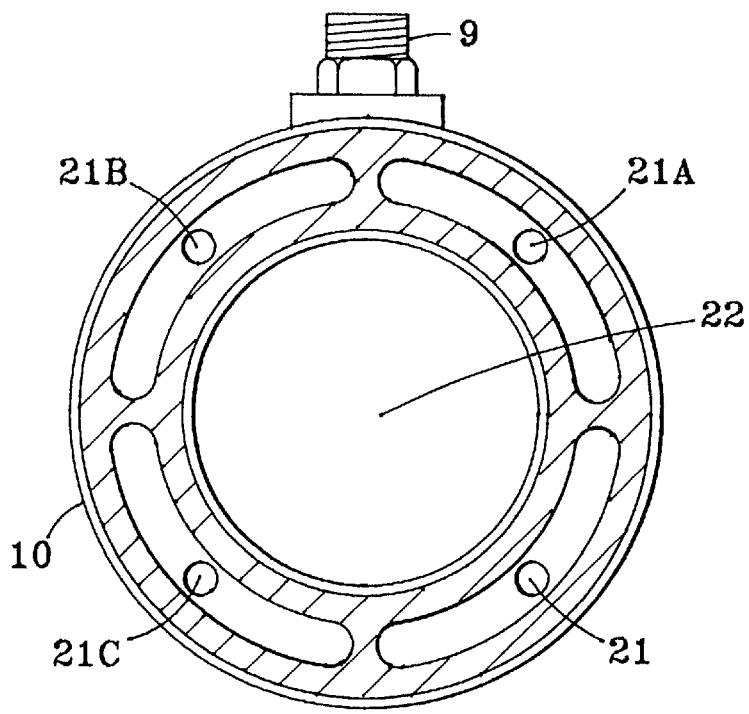
FIG. 7 is an on end cross sectional view of the one of the manifold ring components of the instant invention positionable at the ingress end thereof.
Figure 8:
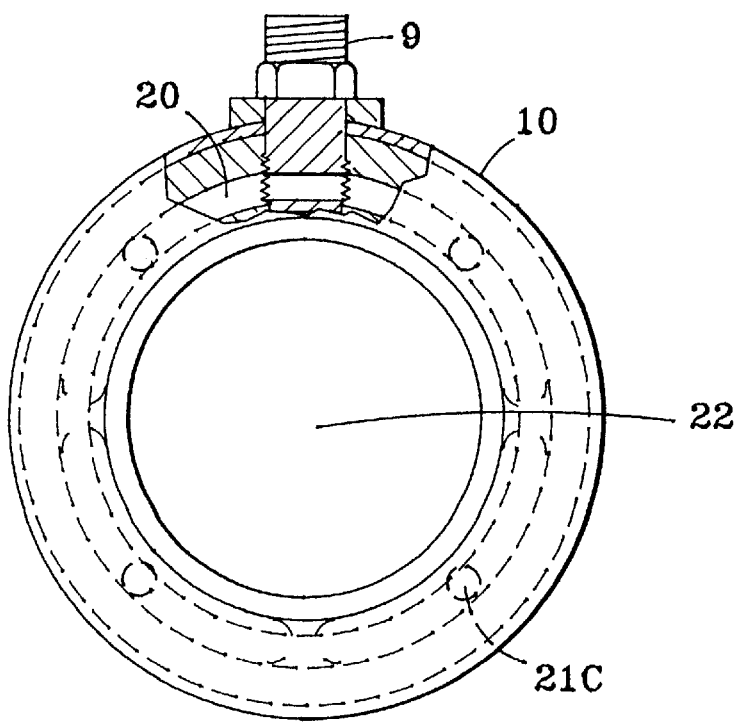
FIG. 8 is an on end cross sectional view opposite the one seen in FIG. 7 of the one of the manifold ring components of the instant invention positionable at the ingress end thereof.
Figure 9:
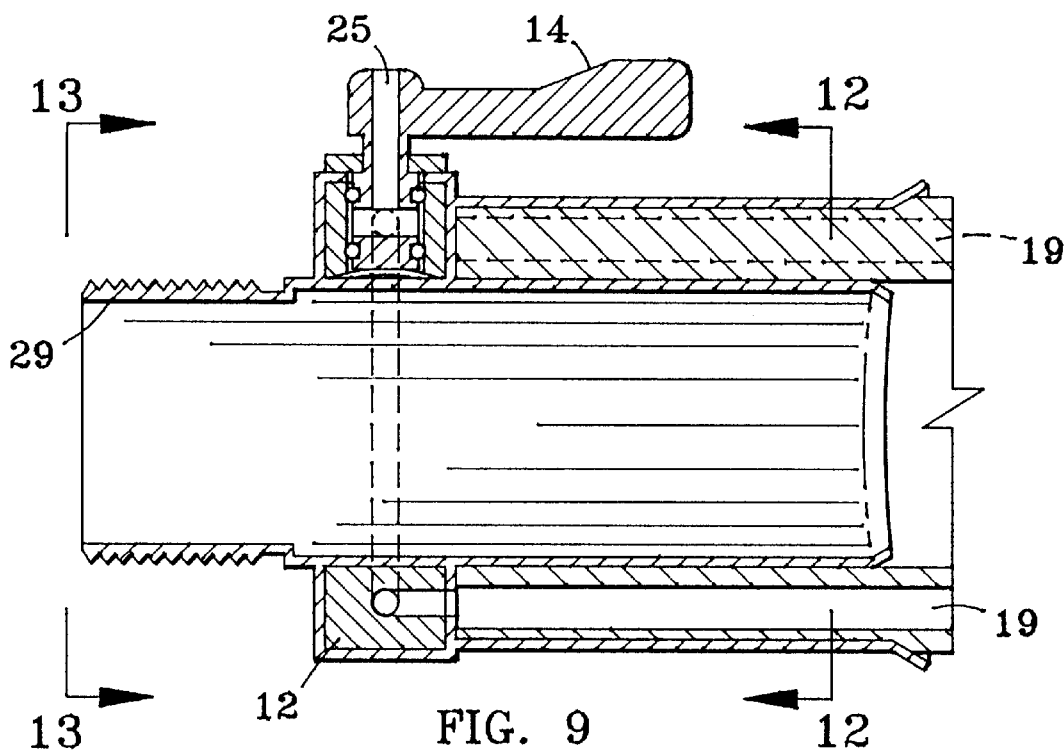
FIG. 9 is a vertical cross-sectional view of the one of the manifold ring components of the instant invention positionable at the discharge end thereof shown affixed to the hosing component of the instant invention.
Figure 10:
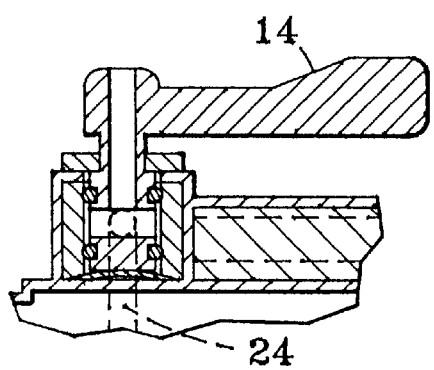
FIG. 10 is an isolated vertical cross-sectional view of a discharge valve positioned atop the manifold ring depicted in FIG. 9.
Figure 11:
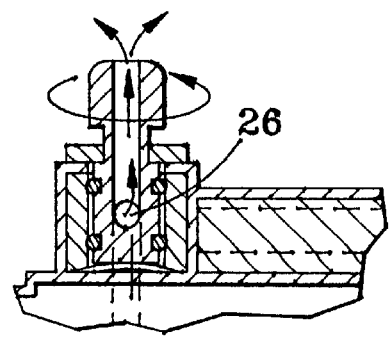
FIG. 11 is an isolated vertical cross-sectional view of the discharge valve shown in FIG. 10 but turned through an angle of 90°.
Figure 12:
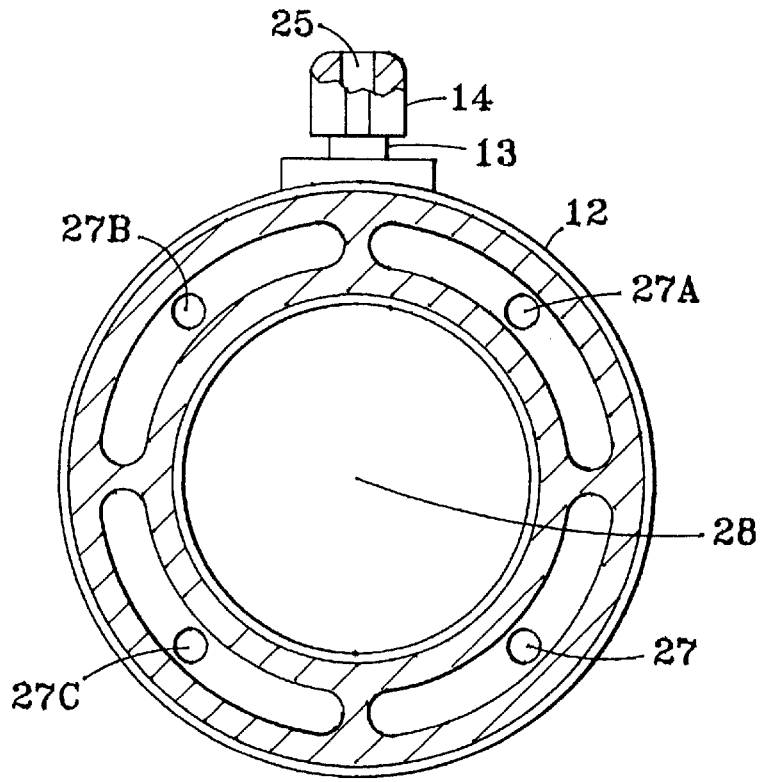
FIG. 12 is an on end cross-sectional view of the manifold ring component of the instant invention shown in FIG. 9 above.
Figure 13:
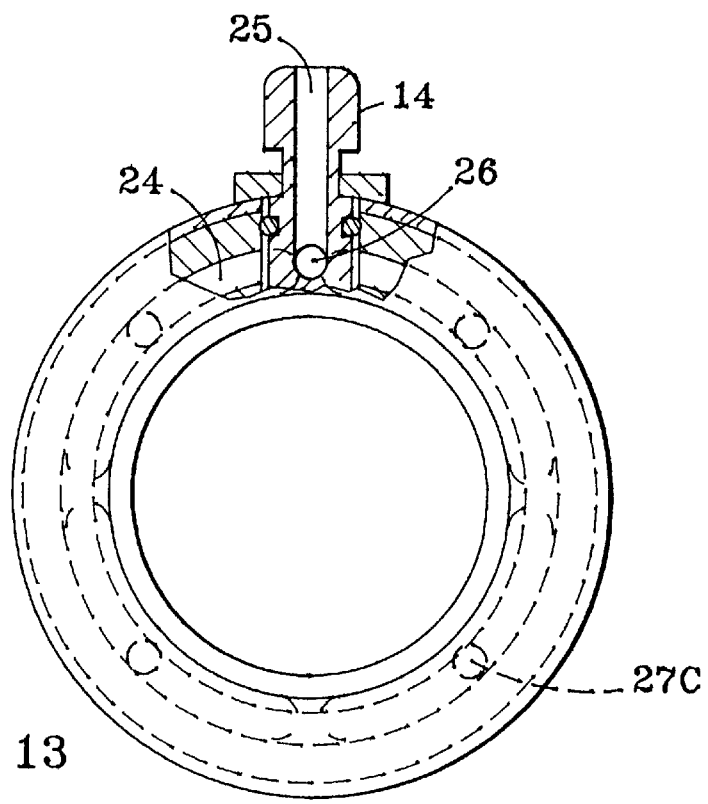
FIG. 13 is an on end cross-sectional view of the manifold ring component of the instant invention shown in FIG. 9 above at the end opposite the end seen in FIG. 12.
Figure 14:
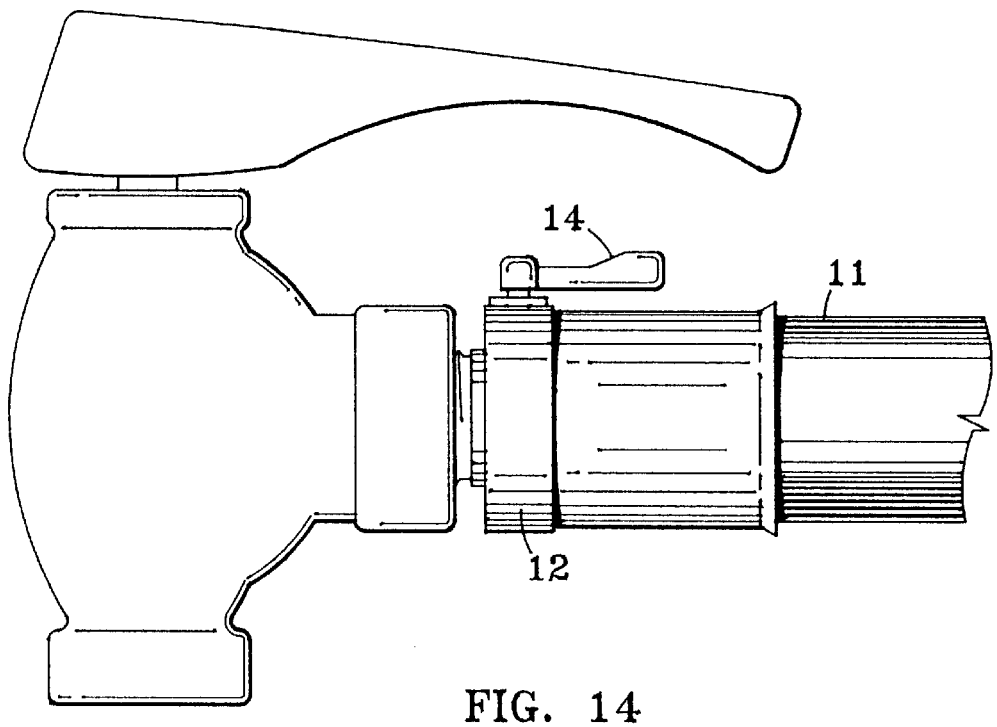
FIG. 14 is a plan view of the discharge end of the first embodiment of the instant invention shown affixed to a port of a home fuel storage tank.
Figure 15:
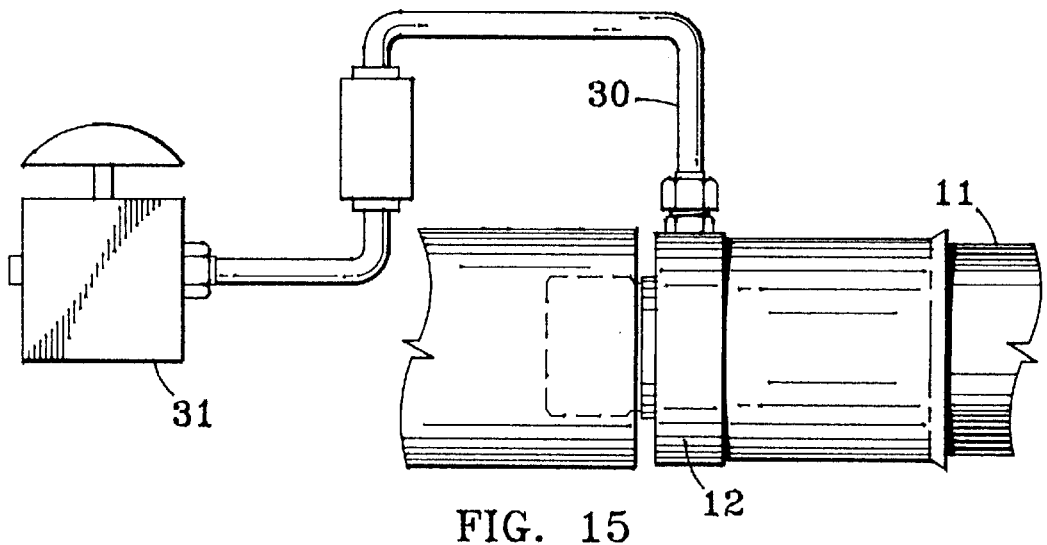
FIG. 15 is a plan view of the discharge end of a second embodiment of the instant invention.
Figure 16:
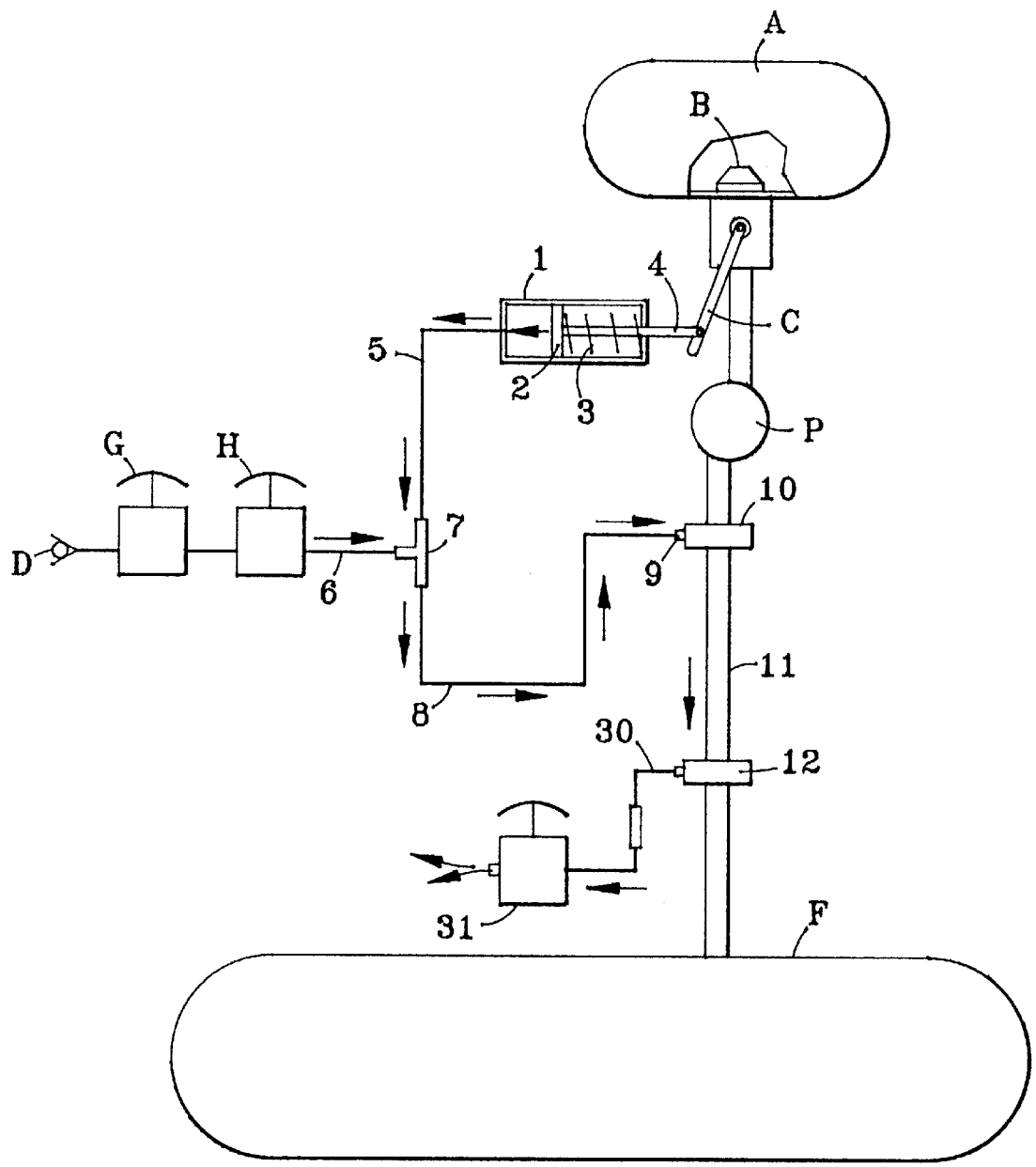
FIG. 16 is a schematic diagram of the various components of the second embodiment of the instant invention depicting non-flow of the fuel stored in a primary bulk storage tank in the absence of gas under pressure within the piping portion of the instant invention.
Figure 17:
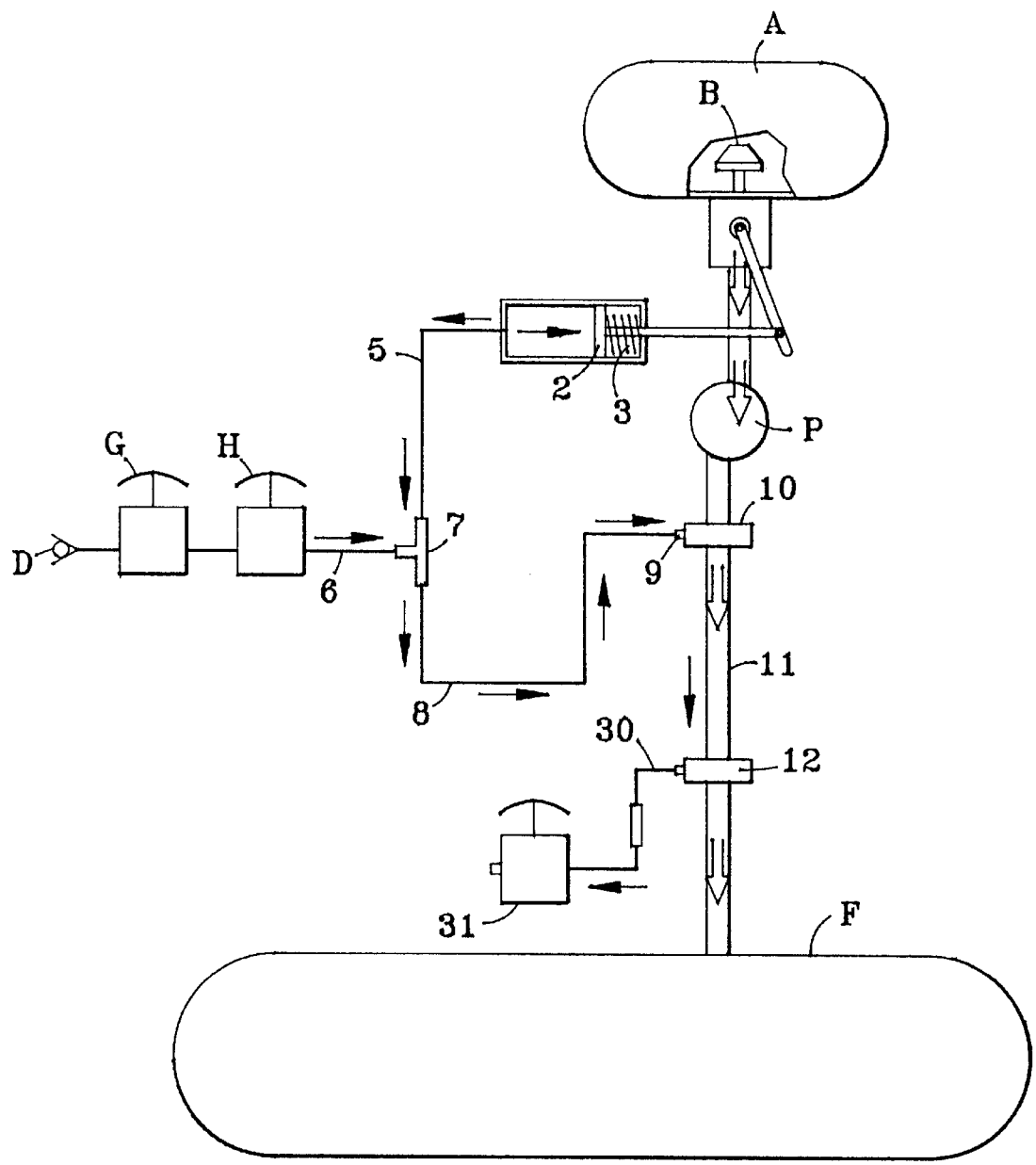
FIG. 17 is a schematic diagram of the various components of the second embodiment of the instant invention depicting flow of the fuel stored in a primary bulk storage tank in the presence of gas under pressure within the piping portion of the instant invention.

A gas such as nitrogen or indeed even air is propelled from a pump site D under pressure via first piping means 6 leading therefrom to a T shaped hollow fitting 7 all as seen in FIG. 3. Second piping means 8 connected to and leading from one end of fitting 7 run to and are connected to first hollow extrusion 9 found on the circumferential outer surface of first manifold ring 10. Third piping means 5 connected to and leading from a second end of fitting 7 run to and are connected to an actuation chamber 1 via an actuation chamber through hole 31. Within chamber 1 there is an actuation piston 2 connected to a lever arm 4 that extends out of chamber 1 through a second actuation chamber through hole 32. Lever arm 4 is pivotably connected to lever arm C which is connected to and operates to open or close release valve B. Actuation cylinder 2 is spring loaded with a spring 3 as depicted in FIGS. 2 or 3. The gas under pressure depicted by black arrows in FIG. 3 causes actuation cylinder 2 to push lever arm 4 so as to cause lever arm C to cause release valve B to open allowing fluid depicted by white arrows in FIG. 3 to flow through inner hosing component 16. The gas under the pressure needed to compress spring loaded actuation cylinder 2 enters first hollow extrusion 9 affixed to this outer circumferential surface of the cylindrically shaped body portion of first manifold ring 10 as seen in FIG. 6 and from there passes directly into a hollowed out cylindrically shaped first ring space 20 located within the cylindrically shaped body portion of first manifold ring 10 as can be visualized with resort to FIG. 8. From hollow space 20, the gas passes through a plurality of ancillary first ring holes 21, 21A, 21B and 21C found in an outer end side of manifold ring 10 as seen in FIGS. 7 and 9 and into spacing 19 as between outer walling of inner hosing component 16 and inner walling of outer hosing component 11. The gas traverses the length of spacing 19 until it reaches a plurality of ancillary second ring holes, 27, 27A, 27B and 27C in an inner end side of second manifold ring 12, as are seen in FIGS. 12 and 13 and from there into hollowed out cylindrically shaped second ring space 24 located within the cylindrically shaped body portion of second manifold ring 10 as can be visualized with resort to FIG. 13. From hollow space 24 the gas passes up to the site of valvular means 14 affixed to the circumferential outer surface of second manifold ring 12 and completely covering and sealing an outer second ring through hole 33 through which the gas passes from hollow space 24 to reach valvular means 14. Alternatively, in lieu of an outer second ring through hole 33, a hollow extrusion 13 with a hole 26 seen in FIG. 13 could be comparably located affixed to the circumferential outer surface of the cylindrically shaped body portion of manifold ring 12 and amenable to being completely covered and sealed by valvular means 14. With valvular means 14 closed as seen in FIG. 9 or FIG. 10, gas pressure at the level of the pressure at pump D is maintained, within spacing between hosing components 11 and 16 and within actuation chamber 1 upon actuation cylinder 2 so as to keep release valve B open to thereby permitting fluid to flow under pressure from pump P from tank A to portal E and tank F. If, however, for any reason, the pressure in the periphery of the system is, in any way diminished, as, for example, perforce of a break in the walling of hosing component 11 or at the site of either manifold ring 10 or 12, then, the pressure within actuation chamber 1 will immediately fall, and, spring loaded actuation cylinder 2 will move forward, pulling lever arm 4 in turn pulling lever arm C so as to effect closure of release valve B. Such gas pressure dependency constitutes a remarkable safety feature as respects the instant invention, since, such dependency totally obviates the possibility of a significant ecological catastrophe such as might otherwise readily occur with mass spillage of flammable or corrosive fluid being continuously pumped under pressure in the face of any such breakage from the moment of such breakage to the time when someone might be, at last, able to deactivate pump P. This sort of safety concern, absent utilization of the instant invention to pump, for example, highly volatile propane from a tank or a truck into a tank at a home residence, is what is so disconcerting to delivery persons in the face of a break in hosing during the course of home delivery. Such delivery persons are understandably very reluctant to leave the nozzle end of hosing broken at some point to return to the locus of a source truck a number of feet away to turn off a compressor unit while highly volatile propane is being blown about through broken hosing under the influence of an operating compressor pump. Such reluctance induces delay in decision making that, of course, only makes the problem much worse, since, under such adverse circumstances every second counts. Such a crisis could be initiated even absent hose breakage, such as, for example, in the event of slippage of a fitting at the site of storage tank on the truck carrying the propane. The instant invention serves to promptly and efficaciously obviate any such crisis. A delivery person has only to rotate valvular means 14 through an angle of 90° as illustrated with resort to FIG. 11 to permit the air in the system to escape via hole 25 seen in FIGS. 12 and 13 thereby causing a drop in pressure significant to cause pressure dependent actuating cylinder 2 to bring about prompt closure of release valve B. A similar sort of safety concern exists within the framework of a setting, to wit, a second embodiment of the instant invention, wherein fuel is sought to be transferred from one large bulk tank, for example, one not mounted to a truck T to another as illustrated in FIGS. 16 and 17 and with reference to FIG. 15. In such a setting, fire or otherwise dangerous heat build up is a never ending concern. In place of valvular means 14 within such a setting, is plastic tubing 30 amenable to melting at temperatures considered dangerous i.e., in excess of 200° F. In the face of heat build up or in the face of the imminence of a potentially deadly fire in evolution, the melting of tubing 30 or the manual engagement of palm valve unit 34 would result in release of the gas just previously under pressure at the locus of sealed outer second ring through hole 33 thereby causing a drop in the pressure of the gas within actuation chamber 1 so as to cause closure of release valve B thereby immediately terminating fluid flow from initial storage site A. Either one of palm valves G or H seen in FIG. 2 in respect of a first application of the instant invention or in FIG. 16 in respect of a second application of the instant invention can be pushed down in order to manually and arbitrarily reduce gas pressure in the system albeit there is no breakage in any of the fittings or hosing of the instant invention. Such palm valves might be found in instances where truck units T would be retrofitted with the instant invention.

In conclusion, respectfully submitted, the instant invention is virtually revolutionary in the art of intertank transportation of highly explosive or corrosive fluids especially from an all important safety vantage point and is consequently indeed new, useful and unique.

I claim:

1. A Multicannular Fluid Delivery System, comprising:
   a. a first cylindrically shaped, flexible hose component with length in excess of a greatest diameter of said first cylindrically shaped, flexible hose component;
   b. a second cylindrically shaped, flexible hose component with length in excess of a greatest diameter of said second cylindrically shaped, flexible hose component;
   c. said second hose component being entirely circumscribed by said first hose component;
   d. a first manifold ring serving to conduct the flow of a gas through a space as between said first hose component and said second hose component while simultaneously conducting the flow of a liquid through a centrally positioned through hole within said first manifold ring, and being affixed to a first end of said first hose component and to a first end of said second hose component;
   e. said first manifold ring having a solid body portion and being cylindrically shaped about said centrally positioned first through hole, a diameter of which said first through hole is similar in size to said greatest diameter of said second hose component;
   ee. hosing means connected at a first end thereof to a first bulk transfer tank and at a second end thereof to said first manifold ring about said centrally positioned through hole and serving to conduct the flow of said liquid from said first said first bulk transfer tank under pressure from a pump P into said centrally positioned through hole when a fluid release valve within said first bulk transfer tank is in an open position;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hose component and said second hose component;

h. said first manifold ring being fitted with a first hollow extrusion affixed to a circumferential outer surface of said first manifold ring with said first hollow extrusion being in direct access to said hollowed out cylindrically shaped first ring space;

i. a second manifold ring serving to conduct the flow of gas through said space as between said first hose component and said second hose component while simultaneously conducting the flow of said liquid through a centrally positioned through hole within said second manifold ring, and being affixed to a second end of said first hose component and to a second end of said second hose component, said first manifold ring being disposed between said pump P and said second manifold ring adjacent a bulk storage tank for ultimate receipt of said liquid;

j. said second manifold ring having a solid body portion and being cylindrically shaped about said centrally positioned second through hole, a diameter of which said second through hole is similar in size to said greatest diameter of said second hose component;

k. said second through hole being circumscribed by a plurality of ancillary second ring holes through an end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hose component and said second hose component;

m. said second manifold ring being fitted with a hollow extrusion affixed to a circumferential outer surface of said second manifold ring with said hollow extrusion being in direct access to said hollowed out cylindrically shaped second ring space;

n. valve means for controlling the flow of said gas and being affixed to and completely covering and sealing said hollow extrusion;

o. first piping means affixed at one end thereof to an outflow tube affixed to a pump mechanism from which said pump mechanism, compressed gas emanates;

p. said first piping means being affixed at a second end to a first end of a T shaped hollow fitting piece;

q. second piping means being affixed qt one end thereof to a second end of said T shaped hollow fitting piece;

r. third piping means being affixed at one end thereof to a third end of said T shaped hollow fitting piece;

s. a second end of said second piping means being affixed at a second end thereof to said first hollow extrusion;

t. a second end of said third piping means being amenable to being affixed to a first actuation chamber through hole in one side of an actuation chamber;

u. said actuation chamber being affixed to mounting means in the vicinity of said first bulk transfer tank;

v. a spring loaded actuation piston attached to a lever arm within said actuation chamber, a portion of which said lever arm extends to the exterior of said actuation chamber through a second actuation chamber through hole 180° removed from said first actuation chamber through hole;

w. said portion of said lever arm extending to the exterior of said actuation chamber being pivotably connected to means for opening and closing said fluid release valve within said first bulk transfer tank, and;

ww. said compressed gas within said third piping means serving to compress a spring component of said springloaded actuation piston upon entry of said compressed gas therefrom into said actuation chamber thereby opening said release valve.

2. The multicannular fluid delivery system of amended claim 1, whereby a plurality of stiff struts are affixed to inner walling of said first hose component and to outer walling of said second hose component at a plurality of locations along said length of said first hose component and along said lengths of said second hose component.

3. A Multicannular Fluid Delivery System, comprising:

a. a first cylindrically shaped, flexible hose component with length in excess of a greatest diameter of said first cylindrically shaped, flexible hose component;

b. a second cylindrically shaped, flexible hose component with length in excess of a greatest diameter of said second cylindrically shaped, flexible hose component;

c. said second hose component being entirely circumscribed by said first hose component;

d. a first manifold ring serving to conduct the flow of a gas through a space as between said first hose component and said second hose component while simultaneously conducting the flow of a liquid through a centrally positioned through hole within said first manifold ring, and being affixed to a first end of said first hose component and to a first end of said second hose component;

e. said first manifold ring having a solid body portion and being cylindrically shaped about said centrally positioned first through hole, a diameter of which said first through hole is similar in size to said greatest diameter of said second hose component;

ee. hosing means connected at a first end thereof to a first bulk transfer tank and at a second end thereof to said first manifold ring about said centrally positioned through hole and serving to conduct the flow of said liquid from said first said first bulk transfer tank under pressure from a pump P into said centrally positioned through hole when a fluid release valve within said first bulk transfer tank is in an open position;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hose component and said second hose component;

h. said first manifold ring having an outer first ring through hole in a circumferential outer surface of said first manifold ring with said first ring through hole being in direct access to said hollowed out cylindrically shaped first ring space;

i. a second manifold ring serving to conduct the flow of gas through said space as between said first hose component and said second hose component while simultaneously conducting the flow of said liquid through a centrally positioned through hole within said second manifold ring, and being affixed to a second end of said first hose component and to a second end of said second hose component, said first manifold ring being disposed between said pump P and said second manifold ring adjacent a bulk storage tank for ultimate receipt of said liquid;

j. said second manifold ring having a solid body portion and being cylindrically shaped about said centrally positioned second through hole, a diameter of which said second through hole is similar in size to said greatest diameter of said second hose component;

k. said second through hole being circumscribed by a plurality of ancillary second ring holes through an end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hose component and said second hose component;

m. said second manifold ring having an outer second ring through hole in circumferential outer surface of said second manifold ring with said outer second ring through hole being in direct access to said hollowed out cylindrically shaped second ring space;

n. valve means for controlling the flow of said gas being affixed to said circumferential outer surface of said second manifold ring and completely covering and sealing said outer second ring through hole;

o. first piping means affixed at one end thereof to an outflow tube affixed to a pump mechanism from which said pump mechanism, compressed gas emanates;

p. said first piping means being affixed at a second end to a first end of a T shaped hollow fitting piece;

q. second piping means being affixed at one end thereof to a second end of said T shaped hollow fitting piece;

r. third piping means being affixed at one end thereof to a third end of said T shaped hollow fitting piece;

s. a second end of said second piping means being affixed about and covering said outer first ring through hole;

t. a second end of said third piping means being amenable to being affixed to a first actuation chamber through hole in one side of an actuation chamber.

u. said actuation chamber being affixed to mounting means in the vicinity of said first bulk transfer tank;

v. a spring loaded actuation piston attached to a lever arm within said actuation chamber, a portion of which said lever arm extends to the exterior of said actuation chamber through a second actuation chamber through hole 180° removed from said first actuation chamber through hole;

w. said portion of said lever arm extending to the exterior of said actuation chamber being pivotably connected to means for opening and closing said fluid release valve within said first bulk transfer tank, and;

ww. said compressed gas within said third piping means serving to compress a spring component of said springloaded actuation piston upon entry of said compressed gas therefrom into said actuation chamber thereby opening said release valve.

4. The multicannular fluid delivery system of amended claim 2, whereby a plurality of stiff struts are affixed to inner walling of said first hose component and to outer walling of said second hose component at a plurality of locations along said length of said first hose component and along said lengths of said second hose component.

5. A Multicannular Fluid Delivery System, comprising:

a. a first cylindrically shaped, flexible outer hose component with length in excess of a greatest diameter of said first cylindrically shaped, flexible hose component;

b. a second cylindrically shaped, flexible inner hose component with length in excess of a greatest diameter of said second cylindrically shaped, flexible hose component;

c. said second hose component being entirely circumscribed by said first hose component;

d. a first manifold ring serving to conduct the flow of gas through said space as between said first hose component and said second hose component while simultaneously conducing the flow of a liquid through a centrally positioned through hole with said second manifold ring, and being affixed to a first end of said first hose component and to a first end of said second hose component;

e. said first manifold ring having a solid body portion and being cylindrically shaped about said centrally positioned first through hole, a diameter of which said first through hole is similar in size to said greatest diameter of said second hose component;

ee. hosing means connected at a first end thereof to a first bulk transfer tank and a second end thereof to said first manifold ring about said centrally positioned through hole and serving to conduct the flow of said liquid from said first said first bulk transfer tank under pressure from a pump P into said centrally positioned through hole when a fluid release valve within said first bulk transfer tank is in an open position;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hose component and said second hose component;

h. said first manifold ring being fitted with a first hollow extrusion affixed to a circumferential outer surface of said first manifold ring with said first hollow extrusion being in direct access to said hollowed out cylindrically shaped first ring space;

i. a second manifold ring serving to conduct the flow of gas through said space as between said first hose component and said second hose component while simultaneously conducting the flow of said liquid through a centrally positioned through hole within said second manifold ring, and being affixed to a second end of said first hose component and to a second end of said second hose component said first manifold ring being disposed between said pump P and said second manifold ring adjacent a bulk storage tank for ultimate receipt of said liquid;

j. said second manifold ring having a solid body portion and being cylindrically shaped about said centrally positioned second through hole, a diameter of which said second through hole is similar in size to said greatest diameter of said second hose component;

k. said second through hole being circumscribed by a plurality of ancillary second ring holes through an inner end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hose components and said second hose components;

m. said second manifold ring being fitted with a hollow extrusion affixed to a circumferential outer surface of said second manifold ring with said hollow extrusion being in direct access to said hollowed out cylindrically shaped second ring space;

n. valve means for controlling the flow of said gas and being affixed to and completely covering and sealing said hollow extrusion;

o. nozzle means being affixed to an outer end side of said second manifold ring;

p. first piping means affixed at one end thereof to an outflow tube affixed to a pump mechanism from which said pump mechanism, compressed gas emanates;

q. said first piping means being affixed at a second end to a first end of a T shaped hollow fitting piece;

r. second piping means being affixed at one end thereof to a second end of said T shaped hollow fitting piece;

s. third piping means being affixed at one end thereof to a third end of said T shaped hollow fitting piece;

t. a second end of said second piping means being affixed to said first hollow extrusion;

u. a second end of said third piping means being amenable to being affixed to a first actuation chamber through hole in one side of an actuation chamber;

v. said actuation chamber being affixed to mounting means in the vicinity of said first bulk transfer tank;

w. a spring loaded actuation piston attached to a lever arm within said actuation chamber, a portion of which said lever arm extends to the exterior of said actuation chamber through a second actuation chamber through hole in said actuation chamber 180° removed from said first actuation chamber through hole;

x. said portion of said lever arm extending to the exterior of said actuation chamber being pivotably connected to means for opening and closing said fluid release valve within said first bulk transfer tank, and;

xx. said compressed gas within said third piping means serving to compress a spring component of said springloaded actuation piston upon entry of said compressed gas therefrom into said actuation chamber thereby opening said release valve.

6. The multicannular fluid delivery system of amended claim 5, whereby a plurality of stiff struts are affixed to inner walling of said first hose component and to outer walling of said second hose component at a plurality of locations along said length of said first hose component and along said lengths of said second hose component.

7. A Multicannular Fluid Delivery System, comprising:

a. a first cylindrically shaped, flexible hose component with length in excess of a greatest diameter of said first cylindrically shaped, flexible hose component;

b. a second cylindrically shaped, flexible hose component with length in excess of a greatest diameter of said second cylindrically shaped, flexible hose component;

c. said second hose component being entirely circumscribed by said first hose component;

d. a first manifold ring serving to conduct the flow of a gas through a space as between said first hose component and said second hose component while simultaneously conducting the flow of a liquid through a centrally positioned through hole within said first manifold ring, and being affixed to a first end of said first hose component and to a first end of said second hose component;

e. said first manifold ring having a solid body portion and being cylindrically shaped about said centrally positioned first through hole, a diameter of which said first through hole is similar in size to said greatest diameter of said second hose component;

ee. hosing means connected at a first end thereof to a first bulk transfer tank and at a second end thereof to said first manifold ring about said centrally positioned through hole and serving to conduct the flow of said liquid from said first bulk transfer tank under pressure from a pump P into said centrally positioned through hole when a fluid release valve within said first bulk transfer tank is in an open position;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hose component and said second hose component;

h. said first manifold ring having an outer first ring through hole in a circumferential outer surface of said first manifold ring with said first ring through hole being in direct access to said hollowed out cylindrically shaped first ring space;

i. a second manifold ring serving to conduct the flow of gas through said space as between said first hose component and said second hose component while simultaneously conducting the flow of said liquid through a centrally positioned through hole within said second manifold ring, and being affixed to a second end of said first hose component and to a second end of said second hose component, said first manifold ring being disposed between said pump P and said second manifold ring adjacent a bulk storage tank for ultimate receipt of said liquid;

j. said second manifold ring having a solid body portion and being cylindrically shaped about said centrally positioned second through hole, a diameter of which said second through hole is similar in size to said greatest diameter of said second hose component;

k. said second through hole being circumscribed by a plurality of ancillary second ring holes through an end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hose component and said second hose component;

m. said second manifold ring having an outer second ring through hole in a circumferential outer surface of said second manifold ring with said outer second ring through hole being in direct access to said hollowed out cylindrically shaped second ring space;

n. valve means for controlling the flow of said gas and being affixed to said circumferential outer surface of said second manifold ring and completely covering and sealing said outer second ring through hole;

o. nozzle means being affixed to an outer end side of said second manifold ring;

p. first piping means affixed at one end thereof to an outflow tube affixed to a pump mechanism from which said pump mechanism compressed gas emanates;

q. said first piping means being affixed at a second end to a first end of a T shaped hollow fitting piece;

r. second piping means being affixed at one end thereof to a second end of said T shaped hollow fitting piece;

s. third piping means being affixed at one end thereof to a second end of said T shaped hollow fitting piece;

t. a second end of said second piping means being affixed about and covering said first outer ring through hole;

u. a second end of said third piping means being amenable to being affixed to a first actuation chamber through hole in one side of an actuation chamber;

v. said actuation chamber being affixed to mounting means in the vicinity of said first bulk transfer tank;

w. a spring loaded actuation cylinder attached to a lever arm within said actuation chamber, a portion of which said lever arm extends to the exterior of said actuation chamber through a second actuation chamber through hole in said actuation chamber 180° removed from said first actuation chamber through hole;

x. said portion of said lever arm extending to the exterior of said actuation chamber being pivotably connected to means for opening and closing fluid release vale within said first bulk transfer tank, and;

xx. said compressed gas within said third piping means serving to compress a spring component of said springloaded actuation piston upon entry of said compressed gas therefrom into said actuation chamber thereby opening said release valve.

8. The multicannular fluid delivery system of amended claim 7, whereby a plurality of stiff struts are affixed to inner walling of said first hose component and to outer walling of said second hose component at a plurality of locations along said length of said first hose component and along said lengths of said second hose component.

9. A Multicannular Fluid Delivery System, comprising:

a. a first cylindrically shaped, flexible hose component with length in excess of a greatest diameter of said first cylindrically shaped, flexible hose component;

b. a second cylindrically shaped, flexible hose component with length in excess of a greatest diameter of said second cylindrically shaped, flexible hose component;

c. said second hose component being entirely circumscribed by said first hose component;

d. a first manifold ring serving to conduct the flow of a gas through a space as between said first hose component and said second hose component while simultaneously conducting the flow of a liquid through a centrally positioned through hole within said first manifold ring, and being affixed to a first end of said first hose component and to a first end of said second hose component;

e. said first manifold ring have a solid body portion and being cylindrically shaped about said centrally positioned first through hole, a diameter of which said first through hole is similar in size to said greatest diameter of said second hose component;

ee. hosing means connected at a first end thereof to a first bulk transfer tank and at a second end thereof to said first manifold ring about said centrally positioned through hole and serving to conduct the flow of said liquid from said first said first bulk transfer tank under pressure from a pump P into said centrally positioned through hole when a fluid release vale within said first bulk transfer tank is in an open position;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hose component and said second hose component;

h. said first manifold ring being fitted with a first hollow extrusion affixed to a circumferential outer surface of said first manifold ring with said first ring through hole being in direct access to said hollowed out cylindrically shaped first ring space;

i. a second manifold ring serving to conduct the flow of gas through said space as between said first hose component and said second hose component while simultaneously conducting the flow of said liquid through a centrally positioned through hole within said second manifold ring being affixed to a second end of said first hose component and to a second end of said second hose component, said first manifold ring being disposed between said pump P and said second manifold ring adjacent a bulk storage tank for ultimate receipt of said liquid;

j. said second manifold ring having a solid body portion and being cylindrically shaped about said centrally positioned second through hole, a diameter of which said second through hole is similar in size to said greatest diameter of said second hose component;

k. said second through hole being circumscribed by a plurality of ancillary second ring holes through an end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hose component and said second hose component;

m. said second manifold ring being fitted with a hollow extrusion affixed to a circumferential outer surface of said second manifold ring with said hollow extrusion being in direct access to said hollowed out cylindrically shaped second ring space;

n. valve means for controlling the flow of said gas and affixed to plastic tubing meltable at temperatures in excess of 200° F. which said plastic tubing is affixed to and completely covers and seals said hollow extrusion;

o. first piping means affixed at one end thereof to an outflow tube affixed to a pump mechanism from which said pump mechanism compressed gas emanates;

p. said first piping means being affixed at a second end to a first end of a T shaped hollow fitting piece;

q. second piping means being affixed at one end thereof to a second end of said T shaped hollow fitting piece;

r. third piping means being affixed at one end thereof to a third end of said T shaped hollow fitting piece;

s. a second end of said second piping means being affixed at a second end thereof to said first hollow extrusion;

t. a second end of said third piping means being amenable to being affixed to a first actuation chamber through hole in one side of an actuation chamber;

u. said actuation chamber being affixed to mounting means in the vicinity of said first bulk transfer tank;

v. a spring loaded actuation piston attached to a lever arm within said actuation chamber, a portion of which said lever arm extends to the exterior of said actuation chamber through a second actuation chamber through hole in said actuation chamber 180° removed from said first actuation chamber through hole;

w. said portion of said lever arm extending to the exterior of said actuation chamber being pivotably connected to means for opening and closing a fluid release valve within said first bulk transfer tank, and;

ww. said compressed gas within said third piping means serving to compress a spring component of said springloaded actuation piston upon entry of said compressed gas therefrom into said actuation chamber thereby opening said release valve.

10. The multicannular fluid delivery system of amended claim 9, whereby a plurality of stiff struts are affixed to inner walling of said first hose component and to outer walling of said second hose component at a plurality of locations along said length of said first hose component and along said lengths of said second hose component.

11. A Multicannular Fluid Delivery System, comprising:

a. a first cylindrically shaped, flexible hose component with length in excess of a greatest diameter of said first cylindrically shaped, flexible hose component;

b. a second cylindrically shaped, flexible hose component with a length in excess of a greatest diameter of said second cylindrically shaped, flexible hose component;

c. said second hose component being entirely circumscribed by said first hose component;

d. a first manifold ring being serving to conduct the flow of a gas through a space as between said first hose component and said second hose component while simultaneously conducting the flow of a liquid through a centrally positioned through hole within said first manifold ring, and affixed to a first end of said first hose component and to a first end of said second hose component;

e. said first manifold ring having a solid body portion and being cylindrically shaped about said centrally positioned first through hole, a diameter of which said first through hole is similar in size to said greatest diameter of said second hose component;

ee. hosing means connected at a first end thereof to a first bulk transfer tank and at a second end thereof to said first manifold ring about said centrally positioned through hole and serving to conduct the flow of said liquid from said first said first bulk transfer tank under pressure from a pump P into said centrally positioned through hole when a fluid release vale within said first bulk transfer tank is in an open position;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hose component and said second hose component;

h. said first manifold ring having an outer first ring through hole in a circumferential outer surface of said first manifold ring with said first ring through hole being in direct access to said hollowed out cylindrically shaped first ring space;

i. a second manifold ring serving to conduct the flow of gas through said space as between said first hose component and said second hose component while simultaneously conducting the flow of said liquid through a centrally positioned through hole within said second manifold ring, and being affixed to a second end of said first hose component and to a second end of said second hose component, said first manifold ring being disposed between said pump P and said second manifold ring adjacent a bulk storage tank for ultimate receipt of said liquid;

j. said second manifold ring having a solid body portion and being cylindrically shaped about said centrally positioned second through hole, a diameter of which said second through hole is similar in size to said greatest diameter of said second hose component;

k. said second through hole being circumscribed by a plurality of ancillary second ring holes through an end side of said solid body portion of said second manifold ring with diameters less than said diameter of said first through hole.

l. said ancillary second ring through holes being in direct access to a hollowed out cylindrically shaped second ring space within said solid body portion of said second manifold ring and being also in direct access to said space as between said first hose component and said second hose component;

m. said second manifold ring having an outer second ring through hole in a circumferential outer surface of said second manifold ring with said outer second ring through hole being in direct access to said hollowed out cylindrically shaped second ring space;

n. valve means for controlling the flow of said gas and affixed to plastic tubing meltable at temperatures in excess of 200° F. which said plastic tubing is affixed and completely covers and seals said outer second ring through hole;

o. first piping means affixed at one end thereof to an outflow tube affixed to a pump mechanism from which said pump mechanism compressed gas emanates;

p. said first piping means being affixed at a second end to a first end of a T shaped hollow fitting piece;

q. second piping means being affixed at one end thereof to a second end of said T shaped hollow fitting piece;

r. third piping means being affixed at one end thereof to a third end of said T shaped hollow fitting piece;

s. a second end of said second piping means being affixed to said outer first ring through hole;

t. a second end of said third piping means being amenable to being affixed to a first actuation chamber through hole in one side of an actuation chamber;

u. said actuation chamber being affixed to mounting means in the vicinity of said first bulk transfer tank;

v. a spring loaded actuation piston attached to a lever arm within said actuation chamber, a portion of which said lever arm extends to the exterior of said actuation chamber through a second actuation chamber through hole in said actuation chamber, 180° removed from said first actuation chamber through hole;

w. said portion of said lever arm extending to the exterior of said actuation chamber being rotably connected to means for opening and closing said fluid release valve within said first bulk transfer tank, and;

ww. said compressed gas within said third piping means serving to compress a spring component of said springloaded actuation piston upon entry of said compressed gas therefrom into said actuation chamber thereby opening said release valve.

12. The multicannular fluid delivery system of amended claim 11, whereby a plurality of stiff struts are affixed to inner walling of said first hose component and to outer walling of said second hose component at a plurality of locations along said length of said first hose component and along said lengths of said second hose component.

13. A Multicannular Fluid Delivery System, comprising:

a. a first cylindrically shaped, flexible outer hose component with length in excess of a greatest diameter of said first cylindrically shaped, flexible hose component;

b. a second cylindrically shaped, flexible inner hose component with length in excess of a greatest diameter of said second cylindrically shaped, flexible hose component;

c. said second hose component being entirely circumscribed by said first hose component;

d. a first manifold ring serving to conduct the flow of a gas through a space as between said first hose component and said second hose component while simultaneously conducting the flow of a liquid through a centrally positioned through hole within said first manifold ring, and being affixed to a first end of said first hose component and to a first end of said second hose component;

e. said first manifold ring having a solid body portion and being cylindrically shaped about said centrally positioned first through hole, a diameter of which said first through hole is similar in size to said greatest diameter of said second hose component;

ee. hosing means connected at a first end thereof to a first bulk transfer tank and at a second end thereof to said first manifold ring about said centrally positioned through hole and serving to conduct the flow of said liquid from said first said first bulk transfer tank under pressure from a pump P into said centrally positioned through hole when a fluid release valve within said first bulk transfer tank is in an open position;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hose component and said second hose component;

h. said first manifold ring being fitted with a first hollow extrusion affixed to a circumferential outer surface of said first manifold ring with said first hollow extrusion being in direct access to said hollowed out cylindrically shaped first ring space;

i. a second manifold ring serving to conduct the flow of gas through said space as between said first hose component and said second hose component while simultaneously conducting the flow of said liquid through a centrally positioned through hole within said second manifold ring, and being affixed to a second end of said first hose component and to a second end of said second hose component, said first manifold ring being disposed between said pump P and said second manifold ring adjacent a bulk storage tank for ultimate receipt of said liquid;

j. said second manifold ring having a solid body portion and being cylindrically shaped about said centrally positioned second through hole, a diameter of which said second through hole is similar in size to said greatest diameter of said second hose component;

k. said second through hole being circumscribed by a plurality of ancillary second ring holes through an inner end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hose components and said second hose components;

m. said second manifold ring being fitted with a hollow extrusion affixed to a circumferential outer surface of said second manifold ring with said hollow extrusion being in direct access to said hollowed out cylindrically shaped second ring space;

n. valve means for controlling the flow of said gas and affixed to plastic tubing meltable at temperatures in excess of 200° F. which said plastic tubing is affixed to and completely covers and seals said hollow extrusion;

o. nozzle means being affixed to an outer end side of said second manifold ring;

p. first piping means affixed at one end thereof to an outflow tube affixed to a pump mechanism from which said pump mechanism compressed gas emanates;

q. said first piping means being affixed at a second end to a first end of a T shaped hollow fitting piece;

r. second piping means being affixed at one end thereof in a second end of said T shaped hollow fitting piece;

s. third piping means being affixed at one end thereof to a second end of said T shaped hollow fitting piece;

t. a second end of said second piping means being affixed to said first hollow extrusion;

u. a second end of said third piping means being amenable to being affixed to a first actuation chamber through hole in one side of an actuation chamber;

v. said actuation chamber being affixed to mounting means in the vicinity of said first bulk transfer tank;

w. a spring loaded actuation piston attached to a lever arm within said actuation chamber, a portion of which said lever arm extends to the exterior of said actuation chamber through a second actuation chamber through hole in said actuation chamber, 180° removed from said first actuation chamber through hole;

x. said portion of said lever arm extending to the exterior of said actuation chamber being pivotably connected to means for opening and closing said fluid release valve within said first bulk transfer tank, and;

xx. said compressing gas within said third piping means serving to compress a spring component of said springloaded actuation piston upon entry of said compressed gas therefrom into said actuation chamber thereby opening said release valve.

14. The multicannular fluid delivery system of amended claim 13, whereby a plurality of stiff struts are affixed to inner walling of said first hose component and to outer walling of said second hose component at a plurality of locations along said length of said first hose component and along said lengths of said second hose component.

15. A Multicannular Fluid Delivery System, comprising:

a. a first cylindrically shaped, flexible hose component with length in excess of a greatest diameter of said first cylindrically shaped, flexible hose component;

b. a second cylindrically shaped, flexible hose component with length in excess of a greatest diameter of said second cylindrically shaped, flexible hose component;

c. said second hose component being entirely circumscribed by said first hose component;

d. A first manifold ring serving to conduct the flow of a gas through a space as between said first hose component and said second hose component while simultaneously conducting the flow of a liquid through a centrally positioned through hole within said first manifold ring, and being affixed to a first end of said first hose component and to a first end of said second hose component;

e. said first manifold ring having a solid body portion and being cylindrically shaped about said centrally positioned first through hole, a diameter of which said first through hole is similar in size to said greatest diameter of said second hose component;

ee. hosing means connected at a first end thereof to a first bulk transfer tank and at a second end thereof to said first manifold ring about said centrally positioned through hole and serving to conduct the flow of said liquid from said first said first bulk transfer tank under pressure from a pump P into said centrally position through hole when a fluid release valve within said first bulk transfer tank is in an open position;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hose component and said second hose component;

h. said first manifold ring having in an outer first ring through hole in a circumferential outer surface of said first manifold ring with said first ring through hole being in direct access to said hollowed out cylindrically shaped first ring spacer;

i. a second manifold ring serving to conduct the flow of gas through said space as between said first hose component and said second hose component while simultaneously conducting the flow of said liquid through a centrally positioned through hole within said second manifold ring, and being affixed to a second end of said first hose component and to a second end of said second hose component, said first manifold ring being disposed between said pump P and said second manifold ring adjacent a bulk storage tank for ultimate receipt of said liquid;

j. said second manifold ring have a solid body portion and being cylindrically shaped about said centrally positioned second through hole, a diameter of which said second through hole is similar in size to said greatest diameter of said second hose component;

k. said second through hole being circumscribed by a plurality of ancillary second ring holes through an end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hose component and said second hose component;

m. said second manifold ring having an outer second ring through hole in a circumferential outer surface of said second manifold ring with said outer second ring through hole being in direct access to said hollowed out cylindrically shaped second ring space;

n. valve means for controlling the flow of said gas and affixed to plastic tubing meltable at temperatures in excess of 200° F. which said plastic tubing is affixed and completely covers and seals said outer second ring through hole;

o. nozzle means being affixed to an outer end side of said second manifold ring;

p. first piping means affixed at one end thereof to an outflow tube affixed to a pump mechanism from which said pump mechanism compressed gas emanates;

q. said first piping means being affixed at a second end to a first end of a T shaped hollow fitting piece;

r. second piping means being affixed at one end thereof to a second end of said T shaped hollow fitting piece;

s. third piping means being affixed at one end thereof to a third end of said T shaped hollow fitting piece;

t. a second end of said second piping means being affixed to said outer first ring through hole;

u. a second end of said third piping means being amenable to being affixed to a first actuation chamber through hole in one side of an actuation chamber;

v. said actuation chamber being affixed to mounting means in the vicinity of said first bulk transfer tank;

w. a spring loaded actuation cylinder attached to a lever arm within said actuation chamber, a portion of which said lever arm extends to the exterior of said actuation chamber through a second actuation chamber through hole in said actuation chamber, 180° removed from said first actuation chamber through hole;

x. said portion of said lever arm extending to the exterior of said actuation chamber being pivotably connected to means for opening and closing said fluid release valve within said first bulk transfer tank, and;

xx. said compressed gas within said third piping means serving to compress a spring component of said spring-loaded actuation piston upon entry of said compressed gas therefrom into said actuation chamber thereby opening said release valve.

16. The multicannular fluid delivery system of amended claim 15, whereby a plurality of stiff struts are affixed to inner walling of said first hose component and to outer walling of said second hose component at a plurality of locations along said length of said first hose component and along said lengths of said second hose component.

* * * * *